US008159787B2

(12) United States Patent  
Choi et al.

(10) Patent No.: US 8,159,787 B2
(45) Date of Patent: Apr. 17, 2012

(54) ACTUATOR LATCH SYSTEM OF HARD DISK DRIVE INCLUDING MAGNETICALLY LEVITATED LATCH LEVER

(75) Inventors: Byoung-gyou Choi, Suwon-si (KR); Dong-wook Kim, Seoul (KR)

(73) Assignee: Seagate Technology International, Grand Cayman (KY)

( * ) Notice: Subject to any disclaimer, the term of this patent is extended or adjusted under 35 U.S.C. 154(b) by 1109 days.

(21) Appl. No.: 12/025,083

(22) Filed: Feb. 4, 2008

(65) Prior Publication Data

US 2008/0192385 A1 Aug. 14, 2008

(30) Foreign Application Priority Data

Feb. 12, 2007 (KR) .................. 10-2007-0014561

(51) Int. Cl.
*G11B 5/54* (2006.01)
(52) U.S. Cl. .................. 360/256.2; 360/256.4
(58) Field of Classification Search .................. 360/256, 360/256.2, 256.4, 256.5, 256.6
See application file for complete search history.

(56) References Cited

U.S. PATENT DOCUMENTS

| 5,448,435 | A | 9/1995 | Nakazawa et al. | |
|---|---|---|---|---|
| 6,930,859 | B2 * | 8/2005 | Kim et al. | 360/256.2 |
| 7,286,327 | B2 * | 10/2007 | Jeong | 360/256.2 |
| 7,532,439 | B2 * | 5/2009 | Byun et al. | 360/256.4 |
| 7,564,654 | B2 * | 7/2009 | Kim et al. | 360/256.4 |
| 7,616,407 | B2 * | 11/2009 | Nesori et al. | 360/256.2 |
| 7,684,156 | B2 * | 3/2010 | Okutomi et al. | 360/256.2 |
| 7,800,864 | B2 * | 9/2010 | Kim et al. | 360/256.2 |
| 2005/0152069 | A1 | 7/2005 | Jeong | |
| 2005/0180055 | A1 * | 8/2005 | Kim et al. | 360/256.4 |
| 2005/0264941 | A1 | 12/2005 | Tsuda et al. | |
| 2006/0092573 | A1 * | 5/2006 | Chun et al. | 360/256.4 |
| 2006/0215329 | A1 | 9/2006 | Arikawa | |
| 2007/0019332 | A1 * | 1/2007 | Kim et al. | 360/256 |
| 2007/0146937 | A1 * | 6/2007 | Akama et al. | 360/256.4 |
| 2008/0055783 | A1 * | 3/2008 | Heo et al. | 360/256 |
| 2008/0192386 | A1 * | 8/2008 | Hwang et al. | 360/256.2 |
| 2011/0194210 | A1 * | 8/2011 | Lee et al. | 360/256.2 |

FOREIGN PATENT DOCUMENTS

| EP | 1564726 A1 | 8/2005 |
|---|---|---|
| JP | 2001-035103 | 2/2001 |
| JP | 2002-313040 | 10/2002 |
| JP | 2005-078710 | 3/2005 |

* cited by examiner

*Primary Examiner* — Brian Miller
(74) *Attorney, Agent, or Firm* — Volentine & Whitt, PLLC

(57) ABSTRACT

An HDD includes a base, a swing arm, a VCM coil disposed on the rear end portion of the swing arm, a lower yoke and an upper yoke disposed below and above the VCM coil, at least one magnet attached to the yokes, and a latch lever levitated by the at least one magnet. The latch lever includes a hook at one end and a counterbalance at another end. A first magnetic retractor is installed on the counterbalance to apply torque to the latch lever. The first retract member is disposed such that the vertical component of the net magnetic force applied to the first retractor by the magnet(s) is about 0 when the latch lever is located at a position at which a first air gap and a second air gap exist, respectively, immediately below and above the latch lever.

20 Claims, 8 Drawing Sheets

ACTUATOR LATCH SYSTEM OF HARD DISK DRIVE INCLUDING MAGNETICALLY LEVITATED LATCH LEVER

BACKGROUND OF THE INVENTION

1. Field of the Invention

The present invention relates to a hard disk drive. More particularly, the present invention relates to an actuator latch system of a hard disk drive, which locks an actuator of the hard disk drive in place when the disk of the hard disk drive is not rotating.

2. Description of the Related Art

Hard disk drives (HDD) are used in electronic devices such as computers to reproduce data from a disk or record data onto the disk. More specifically, in addition to such a disk, an HDD includes a magnetic (read/write) head, an actuator for moving the magnetic head over a desired location (track) of the disk, and a spindle motor for rotating the disk. The magnetic head is floated a predetermined height from the recording surface of the disk while the disk is rotated, and detects/modifies the magnetization of the recording surface of the disk to reproduce/record data from/onto the disk.

In addition, when the HDD is not in use, that is, when the disk is not rotating, the magnetic head is parked off of the recording surface of the disk. Systems for parking the magnetic head of the HDD include a contact start stop (CSS) type of parking system and a ramp type of parking system. In the CSS type of parking system, an inner circumferential portion of the disk devoid of recorded data is reserved as a parking zone, and the magnetic head is held against the parking zone of the disk when the magnetic head is parked. In the ramp type of parking system, a ramp is disposed radially outwardly of the disk, and the actuator is held against the ramp when the magnetic head is parked.

However, an HDD can be subjected to external shock or vibrations when the HDD is not in use. Such external shock or vibrations have the potential to move the magnetic head out of the parking zone or off of the ramp and onto the recording surface of the disk. If this were allowed to happen, the magnetic head or the recording surface of the disk could be damaged. Therefore, the actuator needs to be locked in place when the magnetic head is parked. To this end, HDDs include various kinds of actuator latch systems.

FIGS. 1A-1C and 2 illustrate a conventional latch system of an HDD for locking the actuator of the HDD in place when the magnetic head is parked.

Figure 1A:
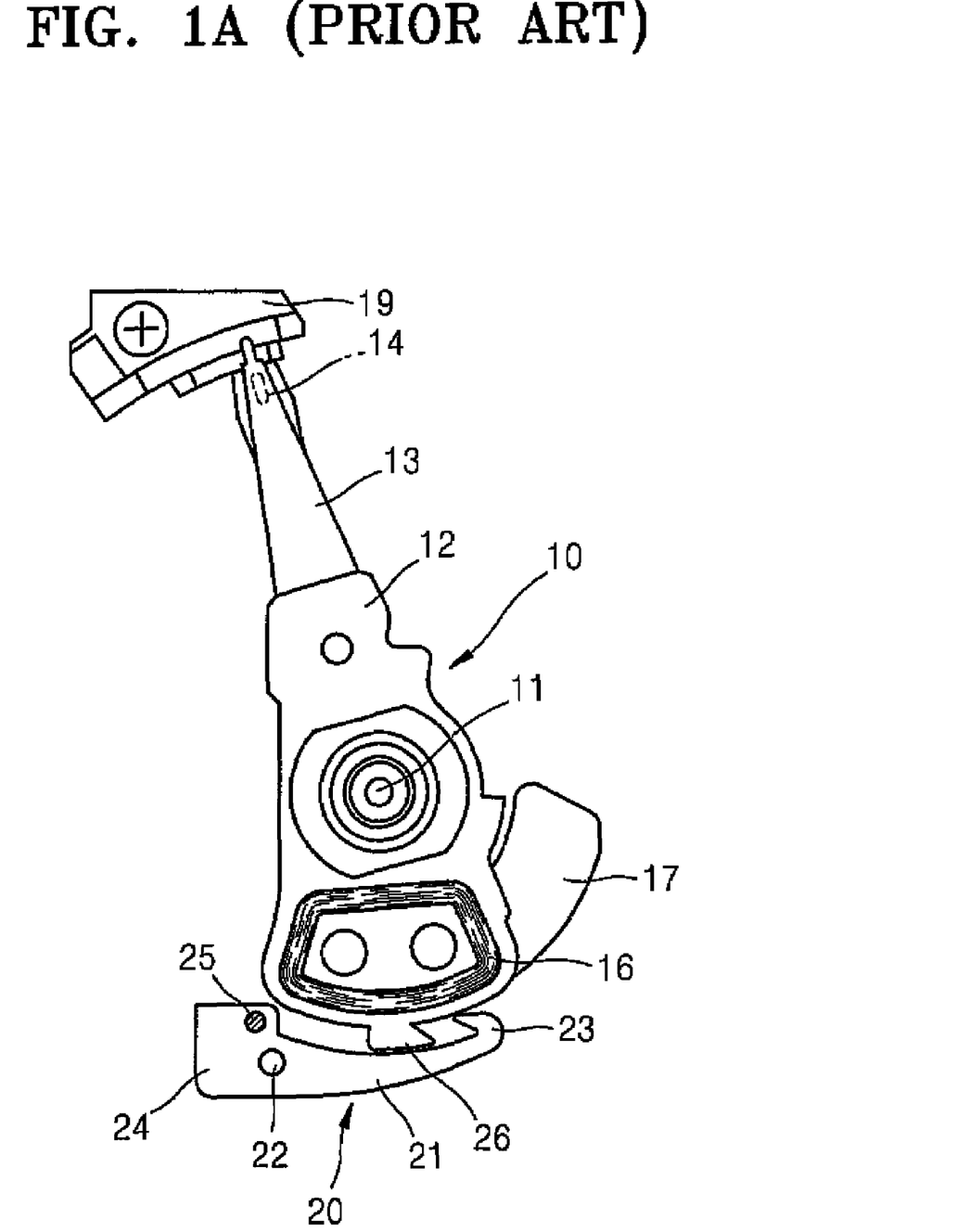
FIGS. 1A, 1B, and 1C are each a plan of a conventional inertial latch system of a hard disk drive (HDD), and together illustrate the operation of the latch system.

Referring to FIG. 1A, the actuator 10 of the HDD includes a swing arm 12 that is rotatably supported by a pivot 11, a suspension 13 disposed on an end portion of the swing arm 12, a slider 14 supported by the suspension 13, and a voice coil motor (VCM) for rotating the swing arm 12 about the axis of pivot 11. The head slider 14 contains the magnetic head. The suspension biases the head slider 14 and hence, the magnetic head, toward a (recording) surface of the disk during a read/write operation in which the magnetic head is recording data onto the disk or reading data from the disk. The VCM includes a VCM coil 16 wound on a rear end portion of the swing arm 12, and a magnet 17 facing the VCM coil 16.

In addition, the HDD includes an inertial latch system 20 for locking the swing arm 12 of the actuator 10 in place when the magnetic head is parked on a ramp 19. The inertial latch system 20 includes a latch lever 21 supported so as to be rotatable about the axis of a pivot 22, and a member constituting an integral part of the swing arm 12 of the actuator 10 and delimiting a notch 26 at the rear end portion of the swing arm 12. The latch lever 21 has a latch hook 23 at a front end thereof, and a counterbalance 24 on rear end thereof. The hook 23 is received within the notch 26 so as to engage the swing arm 12 when the swing arm 12 rotates in one direction while the magnetic head is parked. The inertial latch system 20 also includes a retract ball 25 of a magnetic material installed on the counterbalance 24 such that a magnetic force of attraction is produced between the retract ball 25 and the magnet 17. The magnetic force of attraction generates torque which acts to bias the latch lever 21 in a clockwise direction about the axis of pivot 22.

The conventional inertial latch system 20 operates as follows.

Figure 1B:
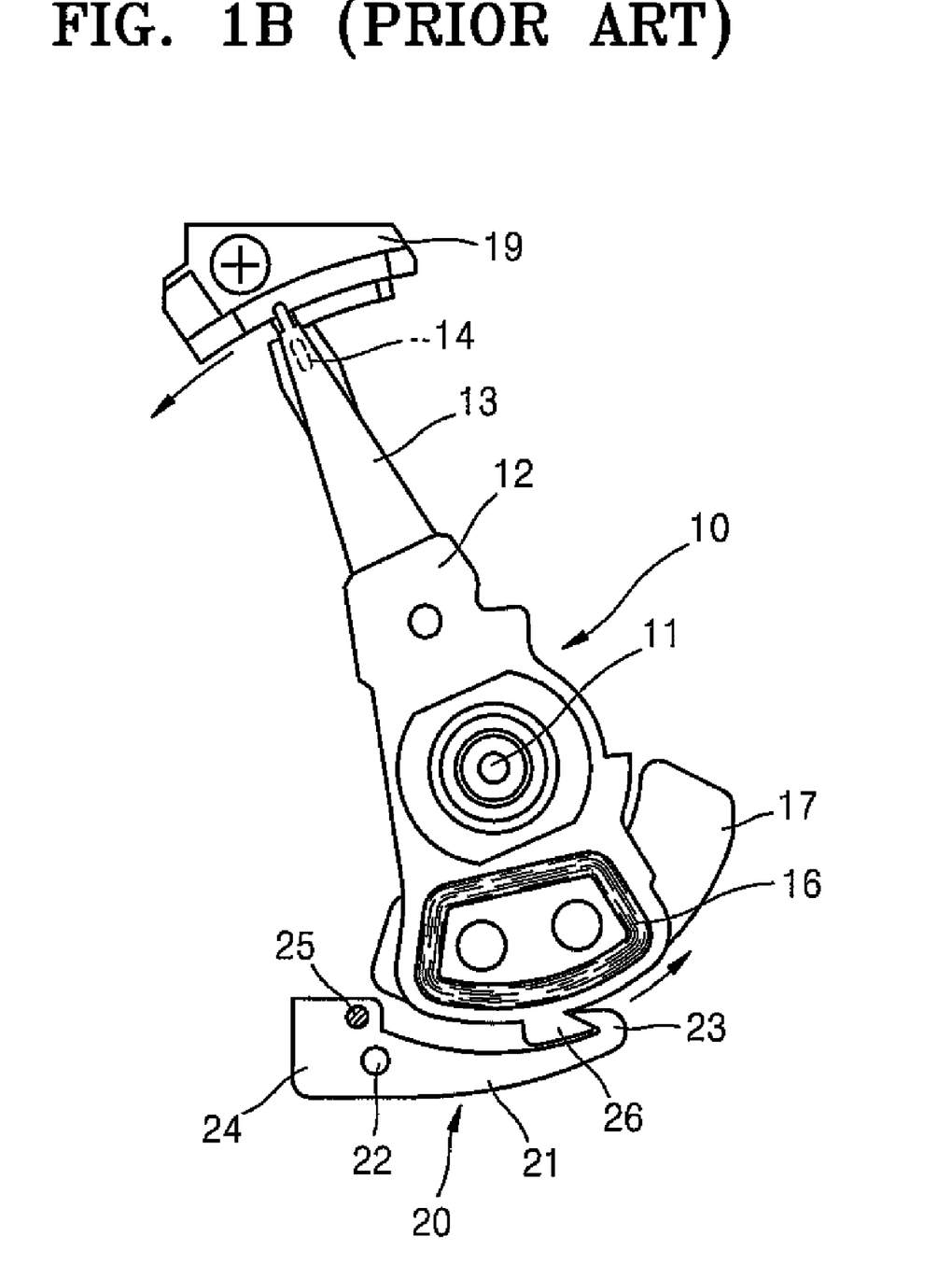

Referring to FIG. 1B when shock applied to the HDD while the magnetic head is parked on the ramp 19 causes the swing arm 12 of the actuator 10 and the latch lever 21 to rotate counter-clockwise due to inertia, the latch hook 23 is received in the notch 26 such that the rotation of the swing arm 12 of the actuator 10 is arrested. On the other hand, when shock applied to the HDD while the magnetic head is parked on the ramp 19 causes the swing arm 12 and the latch lever 21 to rotate clockwise due to inertia, the rear end portion of the swing arm 12 and the counterbalance 24 of the latch lever 21 collide. As a result, the swing arm 12 and the latch lever 21 rebound and rotate counter-clockwise. Therefore, as described above, the latch hook 23 is received in the notch 26 such that the rotation of the swing arm 12 of the actuator 10 is arrested.

Figure 1C:
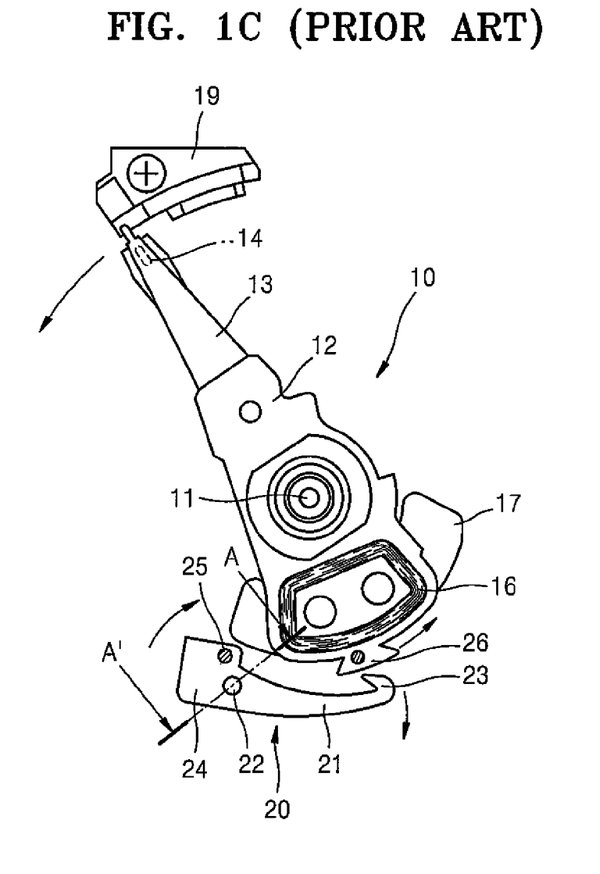

Next, referring to FIG. 1C, the magnetic head is moved from the ramp 19 to a location over a recording surface of the disk in order to conduct a read/write operation. To this end, the swing arm 12 is rotated counter-clockwise by the VCM. At the same time, the latch lever 21 is rotated clockwise by the magnetic force of attraction between the magnet 17 and the retract ball 25. Therefore, the hook 23 of the latch lever 21 does not interfere with the swing arm 12, i.e., the swing arm 12 can rotate freely in the counter-clockwise direction.

However, in this case, the swing arm 12 can be engaged by the hook 23 of the latch lever 21 if the speed at which the latch lever 21 rotates in the clockwise direction is slowed or otherwise becomes irregular. This problem will be described in more detail below.

Figure 2:
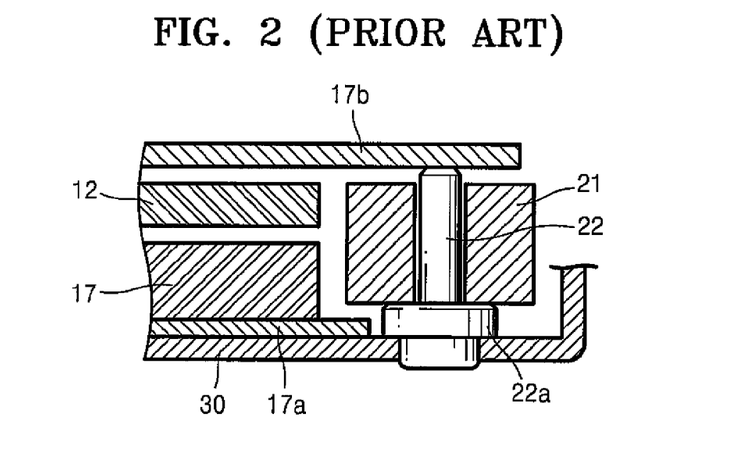
FIG. 2 is a cross-sectional view of a latch lever of the conventional inertial latch system, as taken along line A-A' of FIG. 1C.

Referring to FIG. 2, the pivot 22 is fixed on a base 30 of the HDD, the magnet 17 is mounted on a lower yoke 17a, and an upper yoke 17b extends over the pivot 22. In addition, a bottom surface of the latch lever 21 contacts an upper surface of a flange 22a of the pivot 22. Therefore, friction is created between the flange 22a of the pivot 22 and the latch lever 21 when the latch lever 21 rotates. Sometimes, the contacting surfaces of the latch lever 21 and the flange 22a are rough, or a burr or foreign substance may be present on the contacting surfaces. Also, the latch lever 21 and the upper yoke 17b contact each other if the HDD is used in a mobile electronic device while being turned upside-down. In these cases, the force of friction between the latch lever 21 and the flange 22a of the pivot 22 can be so great that the latch lever 21 does not rotate properly in the clockwise direction. Consequently, the latch system will not release the swing arm 12 when the swing arm 12 is rotated counter-clockwise by the VCM to begin a read/write operation.

Conventionally, protrusions are formed on the upper surface and the bottom surface of the latch lever in attempt to obviate the above-described problem. More specifically, the protrusions reduce the contact area and hence, the force of friction between the latch lever 21 and the flange 22a of the pivot 21. However, this technique does not always prevent the above-described problem from occurring.

SUMMARY OF THE INVENTION

An object of the present invention is to provide an actuator latch system, in a hard disk drive (HDD), having a latch lever that operates reliably, i.e., quickly and smoothly, when rotated.

According to one aspect of the present invention, there is provided an HDD having an actuator latch system that includes a latch lever, and means for magnetically levitating the latch lever.

According to another aspect of the present invention, there is provided a hard disk drive (HDD) comprising a base, a spindle motor mounted to the base, a disk mounted to the spindle motor so as to be rotated by the spindle motor, a swing arm rotatably supported on the base and defining a notch at a rear end portion thereof, a magnetic head supported by the swing arm, a voice coil motor (VCM) that rotates the swing arm, a latch lever disposed adjacent the rear end portion of the swing arm when the swing arm is in a position at which the magnetic head is parked, and a first magnetic retractor integrated with the counterbalance of the latch lever, wherein the first magnetic retractor is used to both generate a torque on the latch lever which biases the latch lever in one direction about its axis of rotation, and levitate the latch lever. The first magnetic retractor preferably consists of a member of magnetic material. The member may be embedded in the latch lever by an insert-molding method.

The VCM includes a voice coil disposed on the rear end portion of the swing arm, a lower yoke and an upper yoke disposed below and above the VCM coil, respectively, and at least one magnet. Each magnet is attached to a respective one of the upper and lower yokes. The latch lever is mounted to the base so as to be rotatable about an axis of rotation, and the latch lever has a hook at one end thereof, and a counterbalance at another end thereof, a top surface and a bottom surface. The latch lever may also have a stopper protruding toward the rear end portion of the swing arm at a location intermediate the hook and the counterbalance. Preferably, the stopper protrudes at a location adjacent the axis of rotation of the latch lever. Also, a weight may be attached to the counterbalance of the latch lever so as to in effect establish the resistance of the latch lever to change its state of motion.

According to a particular aspect of the invention, when the HDD is in an orientation in which the base is facing down and the magnetic head is parked, the vertical component of the net magnetic force exerted on the first magnetic retractor by the at least one magnet is about 0 while the latch lever is at a height at which the top surface and the bottom surface of the latch lever are entirely out of contact with any surfaces that are located immediately below and above the latch lever.

According to yet another particular aspect of the present invention, when the HDD is in an orientation in which the base is facing down and the magnetic head is parked, the vertical component of the net magnetic force exerted on the first magnetic retractor by the at least one magnet acts upwardly and is greater than the net gravitational force exerted on the latch lever due to the mass of the latch lever and the mass of the first magnetic retractor.

Therefore, the latch lever is levitated by the magnetic field produced by the magnet(s) as applied to the first magnetic retractor such that a first air gap and a second air gap exist directly below and above the latch lever, respectively.

The latch lever is mounted so as to be rotatable about an axis of the pivot. The pivot may have a flange at an end thereof adjacent the base. In this case, the latch lever is levitated so that the first air gap is present between the bottom surface of the latch lever and an upper surface of the flange, and the second gap is present between the top surface of the latch lever and a bottom surface of the upper yoke.

A second magnetic retractor may be integrated with the swing arm at the rear end portion of the swing arm. The second magnetic retractor and the magnet(s) produce a magnetic force that generates a torque on the swing arm which biases the swing arm in one direction about the axis of rotation of the swing arm. In this case, the torque applied to the swing arm due the magnetic force produced by the second magnetic retractor and the magnet(s) is greater than the torque applied to the latch lever due the magnetic force produced by the first magnetic retractor and the magnet(s).

According to still another aspect of the invention, the latch lever remains magnetically levitated when the HDD is in either orientation in which the base of the HDD is facing down or the base of the HDD is facing up while the magnetic head is parked. Thus, the present invention is particularly useful in a mobile electronic device that might be flipped upside down while in use.

BRIEF DESCRIPTION OF THE DRAWINGS

The above and other objects features and advantages of the present invention will become more apparent from the following detailed description of the preferred embodiments thereof made with reference to the attached drawings in which.

DETAILED DESCRIPTION OF THE PREFERRED EMBODIMENTS

A hard disk drive (HDD) having an actuator latch system according to the present invention will be described in detail with reference to FIGS. 3-7B. Note, like reference numerals denote like elements throughout the drawings.

Figure 3:
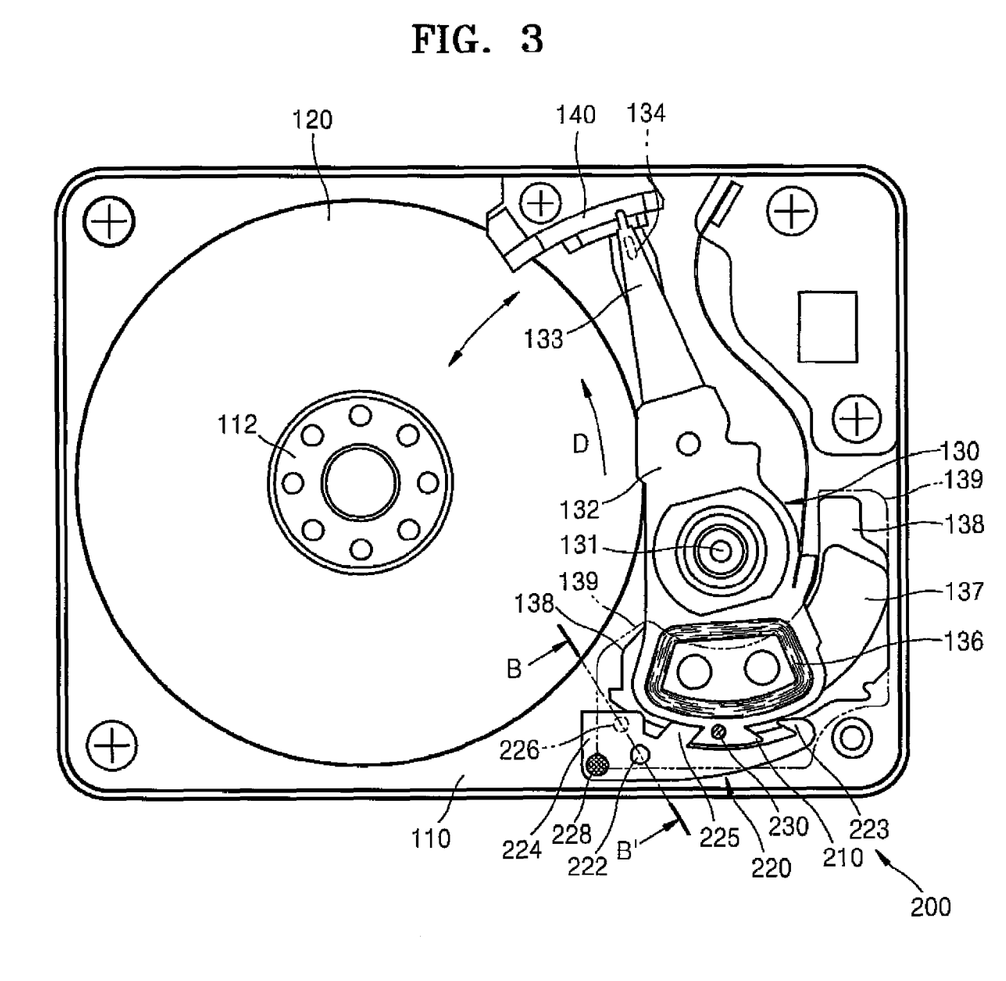
FIG. 3 is a plan view of an HDD including an actuator latch system according to the present invention.
Figure 4:
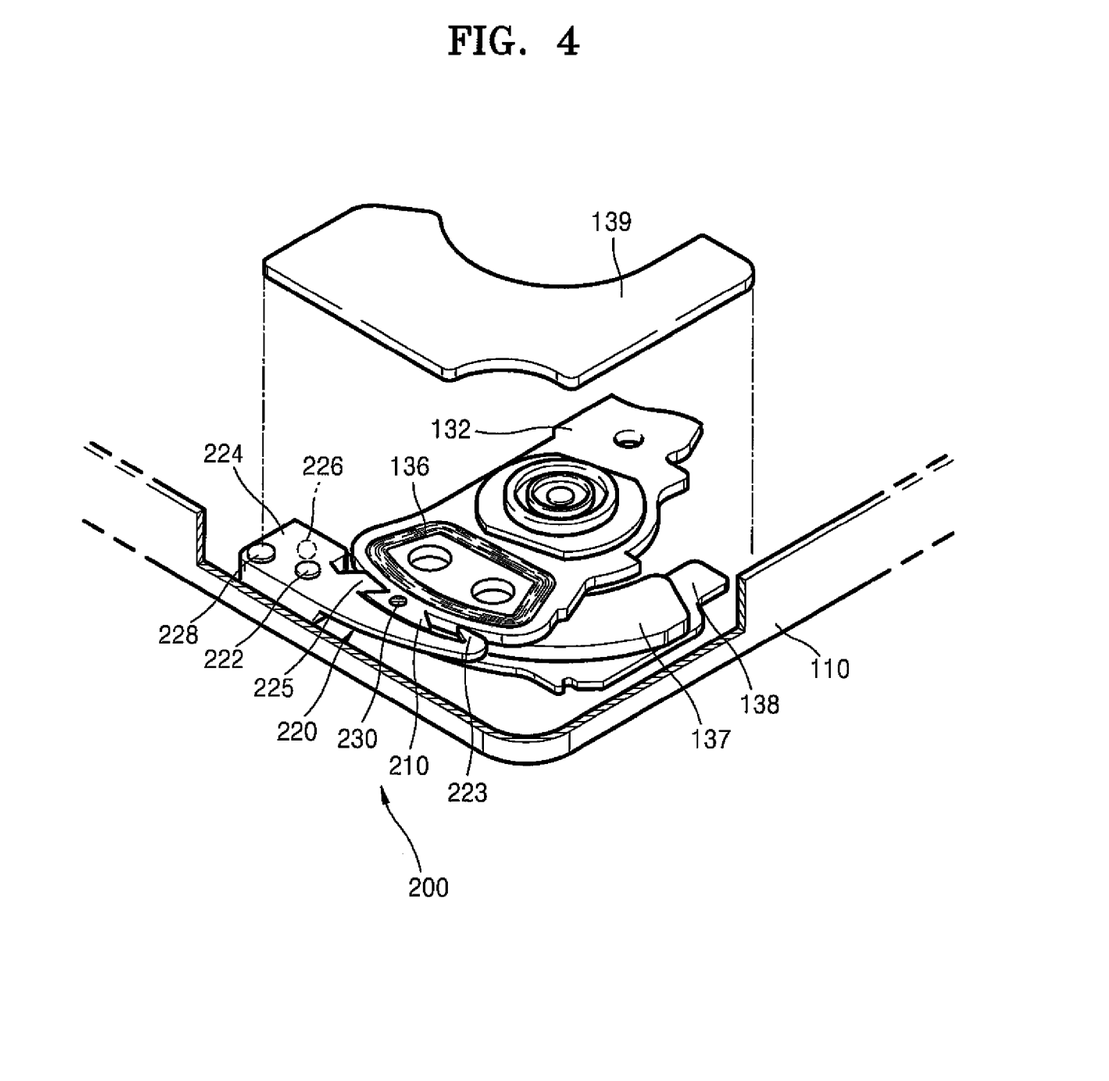
FIG. 4 is an enlarged perspective view of the actuator latch system shown in FIG. 3.

Referring first to FIGS. 3 and 4, the HDD includes a base 110, a spindle motor 112 mounted to the base 110, a disk 120 mounted to the spindle motor 112 so as to be rotated by the spindle motor 112, a magnetic head, and an actuator 130 that moves the magnetic head over the disk 120 to facilitate the recording/reproducing data onto/from the disk 120. The actuator 130 includes a pivot 131 disposed on the base 110, a swing arm 132 supported by the pivot 131 so as to be rotatable, a head slider 134 that contains the magnetic head, a suspension assembly 133 disposed on a front end portion of the swing arm 132 and which supports the head slider 134, and a voice coil motor (VCM) that rotates the swing arm 132 about the central longitudinal axis of the pivot 131. The elasticity of the suspension assembly 133 biases the magnetic head towards a surface of the disk 120 during a read/write operation in which data is being recorded onto or read from the surface of the disk.

The VCM includes a VCM coil 136 disposed on a rear end portion of the swing arm 132, and a magnet or magnets 137 disposed above and/or below the VCM coil 136 so as to face the VCM coil 136. One magnet 137 is attached to the upper surface of a lower yoke 138. The lower yoke 138 is, in turn, fixed to the base 110. Another magnet is attached to the bottom surface of an upper yoke 139. For the sake of clarity, the upper yoke 139 is denoted by a chain line in FIG. 3, and the upper yoke 139 is shown in FIG. 4 as being separated upwardly from the VCM coil 136.

The VCM is controlled by a servo control system that controls the supply of current to the VCM coil 136, and rotates the swing arm 132 in a direction according to Fleming's left-hand rule due to an interaction between the electric current flowing through the VCM coil 136 and the magnetic field formed by the magnets 137. In particular, when the HDD is turned on and the disk 120 starts rotating, the VCM rotates the swing arm 132 counter-clockwise to move the magnetic head onto a recording surface of the disk 120. On the other hand, when the HDD is turned off and the disk 120 stops rotating, the VCM rotates the swing arm 132 clockwise so that the magnetic head is moved off of the recording surface of the disk 120 and is parked. In the embodiment illustrated in FIG. 3, when the disk 120 stops rotating, the swing arm 132 is rotated clockwise by the VCM, and an end-tab of the suspension assembly 133 is slid up and onto a ramp 140. The end tab remains on the ramp 140 to thereby park the magnetic head. However, the present invention may also be applied to an HDD having a CSS type of head parking system. In this case, when the HDD is turned on and the disk 120 starts to rotate, the VCM rotates the swing arm 132 clockwise to move the head from a location over a parking zone of the disk 120 to a location over a data zone of the disk 120. The parking zone is located along an inner peripheral portion of the disk 120 and is devoid of recorded data. The data zone basically extends from the parking zone to the outer circumference of the disk 120. On the other hand, when the HDD is turned off and the disk 120 stops rotating, the VCM rotates the swing arm 132 counter-clockwise to move the head from a location over the data zone to a location over the parking zone where the magnetic head is parked.

The HDD also includes an actuator latch system 200. The actuator latch system 200 retains the actuator 130 when the magnetic head 140 is parked. That is, the actuator latch system prevents external shock or vibrations from rotating the swing arm 132 when the HDD 100 is not in use, i.e., when the magnetic head is parked. In particular, the actuator latch system prevents the magnetic head from being moved into contact with the recording surface of the disk 120 which situation could otherwise result in the recording surface and/ or the magnetic head being damaged.

The actuator latch system 200 includes a member 210 forming a notch at a rear end portion of the swing arm 132, and a latch lever 220. The rear end portion of the swing arm 132 is generally formed of an injection-molded plastic so as to have a shape that accommodates the VCM coil 136. Therefore, the notch-forming member 210 can be easily formed unitarily with the swing arm 132 during the injection molding process. The latch lever 220 is rotatably supported on the base 110 by a pivot 222. Thus, the latch lever 220 rotates (clockwise or counter-clockwise) due to inertia when a shock is applied to the HDD while the magnetic head of the HDD is parked. The operation of the actuator latch system 200 will be described in more detail later.

The latch lever 220 has a hook 223 disposed to one side of the pivot 222, and a counterbalance 224 disposed on the other side of the pivot 222. A weight 228 can be installed on the counterbalance 224. Thus, the resistance of the latch lever 220 to changes in its state of motion can be set by providing a weight 228 of a given mass. The latch lever 220 also has a stopper 225 that protrudes from an intermediate portion of the latch lever 220, that is, a portion adjacent to the pivot 222. When the swing arm 132 is rotated in the clockwise direction to park the magnetic head, the stopper 225 contacts the notch-forming member 210 of the swing arm 132 to arrest the rotation of the swing arm 132 in the clockwise direction. Accordingly, the swing arm 132 is stopped at a precise parked position.

The actuator latch system 200 also includes a magnetic latch retractor, namely a first retract member 226, installed on the counterbalance 224 of the latch lever 220. Specifically, the first retract member 226 is embedded in the counterbalance 224 of the latch lever 220 using an insert molding method. The first retract member 226 can have the form of a ball or a pin. The first retract member 226 is of a magnetic material, for example, is of steel which is ferromagnetic, so that a magnetic force is produced between the first retract member 226 and the magnet(s) 137. The field lines are such that the magnetic force generates torque that biases the latch lever 220 in the clockwise direction. In addition, the field lines are such that the first retract member 226 levitates the latch lever 220. This function of the first retract member 226 will be described in more detail with reference to FIGS. 5 and 6.

Figure 5:
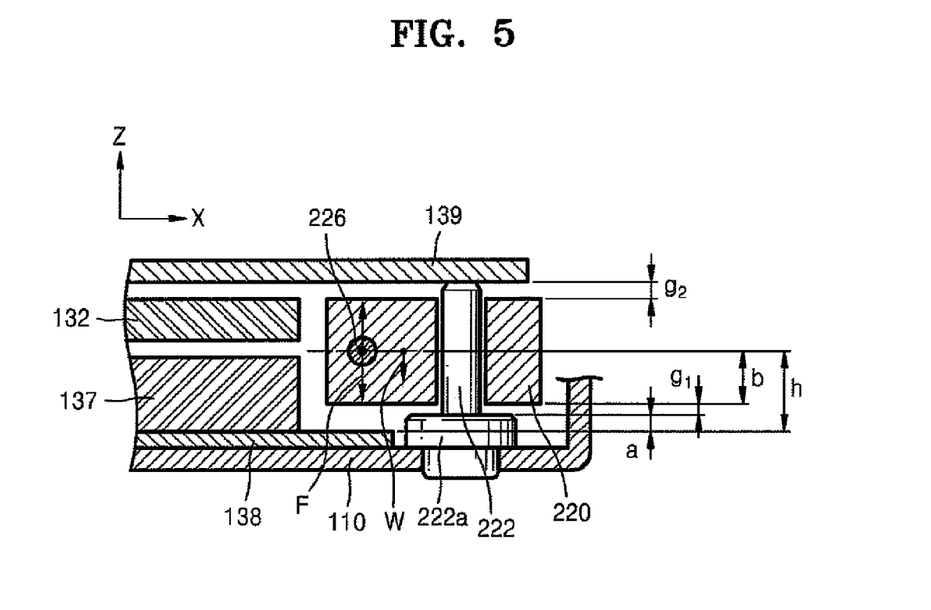
FIG. 5 is a cross-sectional view of the actuator latch system taken along line B-B' of FIG. 3.

Referring to FIG. 5, the pivot 222 is fixed on the base 110 of the HDD, one magnet 137 is attached to an upper surface of the lower yoke 138, the upper yoke 139 extends over the pivot 222, and another magnet (not shown in the figure) is attached to a bottom surface of the upper yoke 139. Therefore, the net magnetic force exerted on the first retract member 226 has a horizontal component that rotates the first retract member 226 in the horizontal direction (X-axis direction), and a vertical component (F) that moves the retract member 226 in the vertical direction (Z-axis direction). As described above, the horizontal component of the magnetic force generates the torque that rotates the latch lever 220 in the clockwise direction. The vertical component (F) may be the result of opposing magnetic forces applied to the first retract member 126 by the magnets 137.

Figure 6:
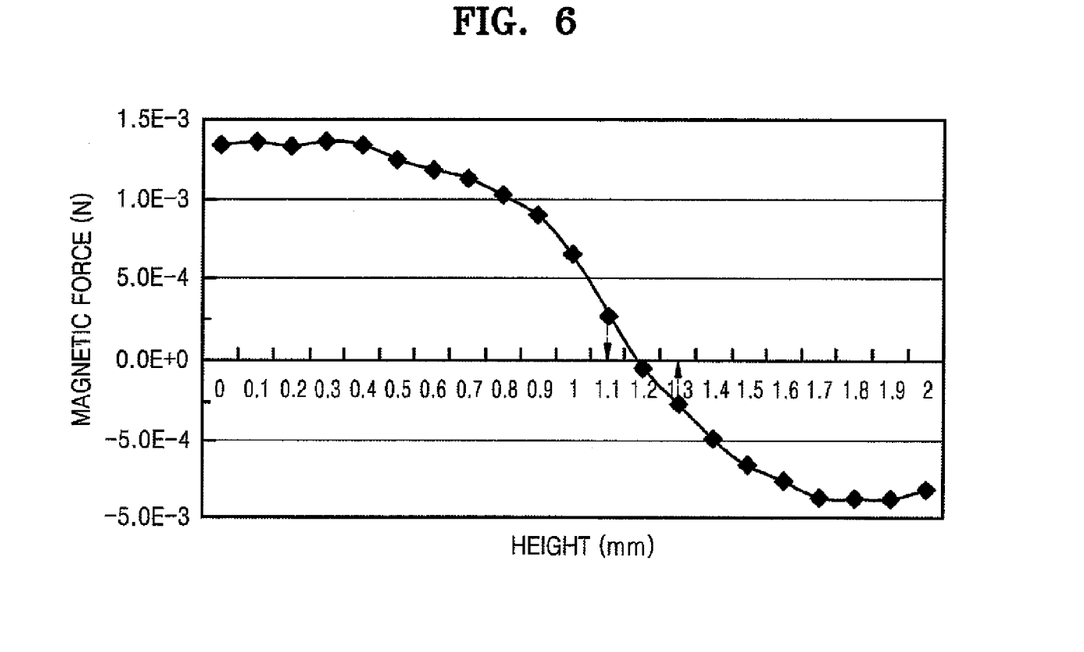
FIG. 6 is a graph illustrating vertical components of a net magnetic force applied to a first retract member of the actuator latch system at various positions (heights) of the first retract member.

FIG. 6 is a graph illustrating the relationship between the magnitude of the vertical component of the magnetic force that is applied to the first retract member 226 and the height (h) of the first retract member 226 (the distance between the upper surface of the lower yoke 138 and the center of the first retract member 226). The numerical values in the graph of FIG. 6 are the results of measurements taken on a 0.85 inch HDD.

As is evident from the graph of FIG. 6, the vertical component F of the magnetic force acts on the first retract member 226 in an upward direction when the height h of the first retract member 226 is small, that is, when the first retract member 226 is close to the lower yoke 138. On the other hand, the vertical component F of the magnetic force acts on the first retract member 226 in a downward direction when the height h of the first retract member 226 is large, that is, when the first retract member 226 is close to the upper yoke 139. In addition, the vertical component F of the magnetic force acting on the first retract member 226 is substantially 0 or is negligible when the height h of the first retract member 226 is about 1.2 mm.

Therefore, as shown in FIG. 5, the first retract member 226 is levitated by the magnets 137 so as to remain at a height of 1.2 mm above the upper surface of the lower yoke 138. Accordingly, a first gap g1 is formed between the bottom surface of the latch lever 220 and an upper surface of a flange 222a of the pivot 222, and a second gap g2 is formed between the upper surface of the latch lever 220 and the bottom surface of the upper yoke 139. That is, the latch lever 220 does not contact the flange 222a or the upper yoke 139.

Meanwhile, though, a force acting in a downward direction is applied to the retract member 226 due to gravity. This force is the total weight W of the first retract member 226 and the latch lever 220. In a 0.85 inch HDD, the weight W is about 2.5E-4 N, which is smaller than the maximum vertical component F of the magnetic force applied to the first retract member 226 in the upward direction in both the case shown in FIG. 5 and the case in which the HDD is upside down with respect to the orientation shown in FIG. 5 (as can occur especially when the HDD is employed in a mobile electronic device). Thus, the first gap g9 and the second gap g2 are larger than the change in height of the first retract member 226 due to the weight W. That is, the latch lever 220 does not contact the flange 222a of the pivot shaft 222 or the upper yoke 139 despite the weight W of the first retract member 226 and latch lever 220. Moreover, the magnet(s) 137 can be designed to produce a magnetic force large enough to make the weight W negligible as concerns the total force that acts on the retract member 226 in the vertical direction. In any case, the sum of the forces (magnetic and gravitational) acting on the retract member 226 in the vertical direction is 0 when the retract member 226 is located at a position at which the first and second gaps g9 and g2 are maintained, i.e., when the retract member 226 is located at a position at which the latch lever 220 does not contact the flange 222a or the upper yoke 139.

In the example shown in FIG. 5, the height h where the vertical component F of the magnetic force applied to the first retract member 226 becomes 0 is 1.2 mm, and the distance (a) between the upper surface of the lower yoke 138 and the upper surface of the flange 222a of the pivot shaft 222 is 0.2 mm. Also, the first gap g1 between the bottom surface of the latch lever 220 and the upper surface of the flange 222a of the pivot shaft 222 is at least 0.1 mm, and the distance (b) between the bottom surface of the latch lever 220 and the center of the first retract member 226 is 0.9 mm. That is, the first retract member 226 is installed so as to be spaced 0.9 mm from the bottom surface of the latch lever 220 so that the latch lever 220 will remain raised above the flange 222a of the pivot 222.

The first gap g9 between the bottom surface of the latch lever 220 and the upper surface of the flange 222a of the pivot 222 are designed to be at least 0.1 mm because the weight W acts to reduce the height of the retract member 226 by about 0.1 mm. Therefore, the first gap g9 and the second gap g2 are each preferably designed to be 0.15-0.3 mm when the retract member 226 is 1.2 mm above the upper surface of the first yoke 138 to leave a margin (actual gap) of 0.05-0.2 mm when the total weight W (of the retract member 226 and the latch lever 220) is factored in.

Referring back to FIGS. 3 and 4, a second magnetic retractor, namely a second retract member 230, can be installed on the rear end portion of the swing arm 132. Preferably, the second retract member 230 is disposed on the notch-forming member 210 of the swing arm 132. The second retract member 230 is of a magnetic material, for example, steel which is ferromagnetic. Therefore, a magnetic force of attraction is produced between the magnet(s) 137 and the second retract member 230. The magnetic force of attraction, in turn, generates torque that biases the swing arm 132 in the clockwise direction about the axis of pivot 131. The biasing of the swing arm 132 in the clockwise direction prevents weak shocks and vibrations from rotating the swing arm 132 counter-clockwise while the magnetic head is parked. In addition, the torque applied to the swing arm 132 by the second retract member 230 is greater than the torque applied to the latch lever 220 by the first retract member 226. Therefore, the swing arm 132 is not rotated counter-clockwise direction by the torque applied to the latch lever 220 in the clockwise direction while the swing arm 132 is in a position at which the magnetic head is parked.

Next, the operation in which the magnetic head is parked will be described.

When the HDD stops operating, the swing arm 132 is rotated clockwise by the VCM. As a result, the notch-forming member 210 at the rear end portion of the swing arm 132 contacts the stopper 225, and the latch lever 220 is rotated counter-clockwise by the swing arm 132. The VCM is turned off once the (end tab of the) swing arm 132 is disposed on the ramp 140 at a location at which the magnetic head is parked. At this time, the swing arm 132 is maintained in position by the torque applied to the swing arm 132 in the clockwise direction due to the magnetic force of attraction between the second retract member 230 and the magnet(s) 137. In addition, as described above, the swing arm 132 is maintained stably in position because the torque is greater than that applied to the latch lever 220 due to the magnetic force of attraction between the first retract member 226 and the magnet(s) 137.

The function of the actuator latch system according to the present invention, while the magnetic head is parked, will now be described in more detail with reference to FIGS. 7A and 7B.

Figure 7A:
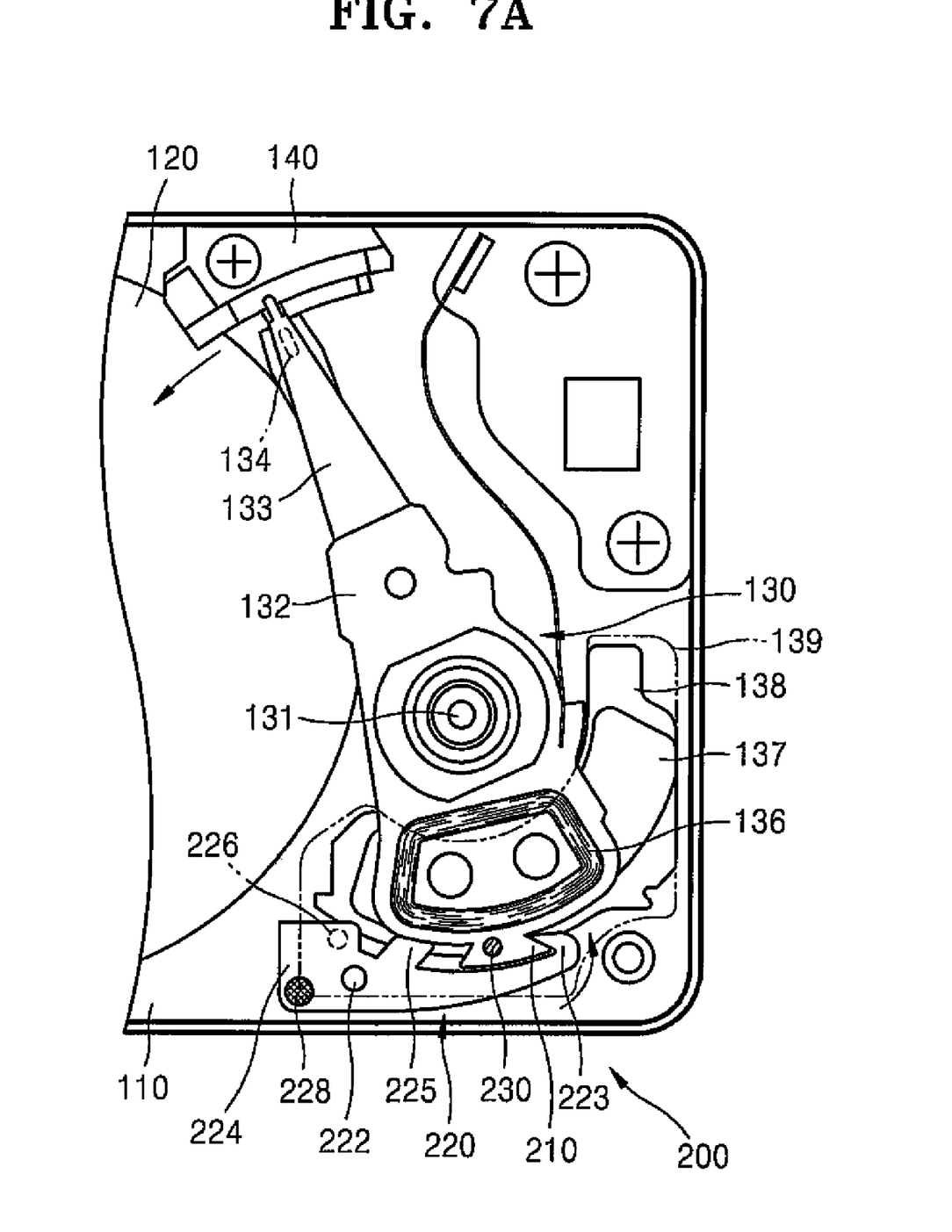
FIG. 7A is a plan view of the actuator latch system according to the present invention and illustrates the locking of an actuator of the HDD with the latch system.

Referring to FIG. 7A, a shock applied to the HDD while the magnetic head is parked can rotate the swing arm 132 and the latch lever 220 counter-clockwise due to inertia. In this case, the notch-forming member 210 at the rear end portion of the swing arm 132 is engaged by the hook 223 of the latch lever 220. Thus, the counter-clockwise rotation of the swing arm 132 is arrested.

On the other hand, the swing arm 132 and the stopper 225 of the latch lever 220 collide when a shock applied to the HDD rotates the swing arm 132 and the latch lever 220 clockwise due to inertia, while the magnetic head is parked. As a result, the swing arm 132 and the latch lever 220 rebound from one another so as to both rotate counter-clockwise. Then, as described above, the notch-forming member 210 of the swing arm 132 is engaged by the hook 223 of the latch lever 220 whereupon the swing arm 132 cannot rotate any further.

Figure 7B:
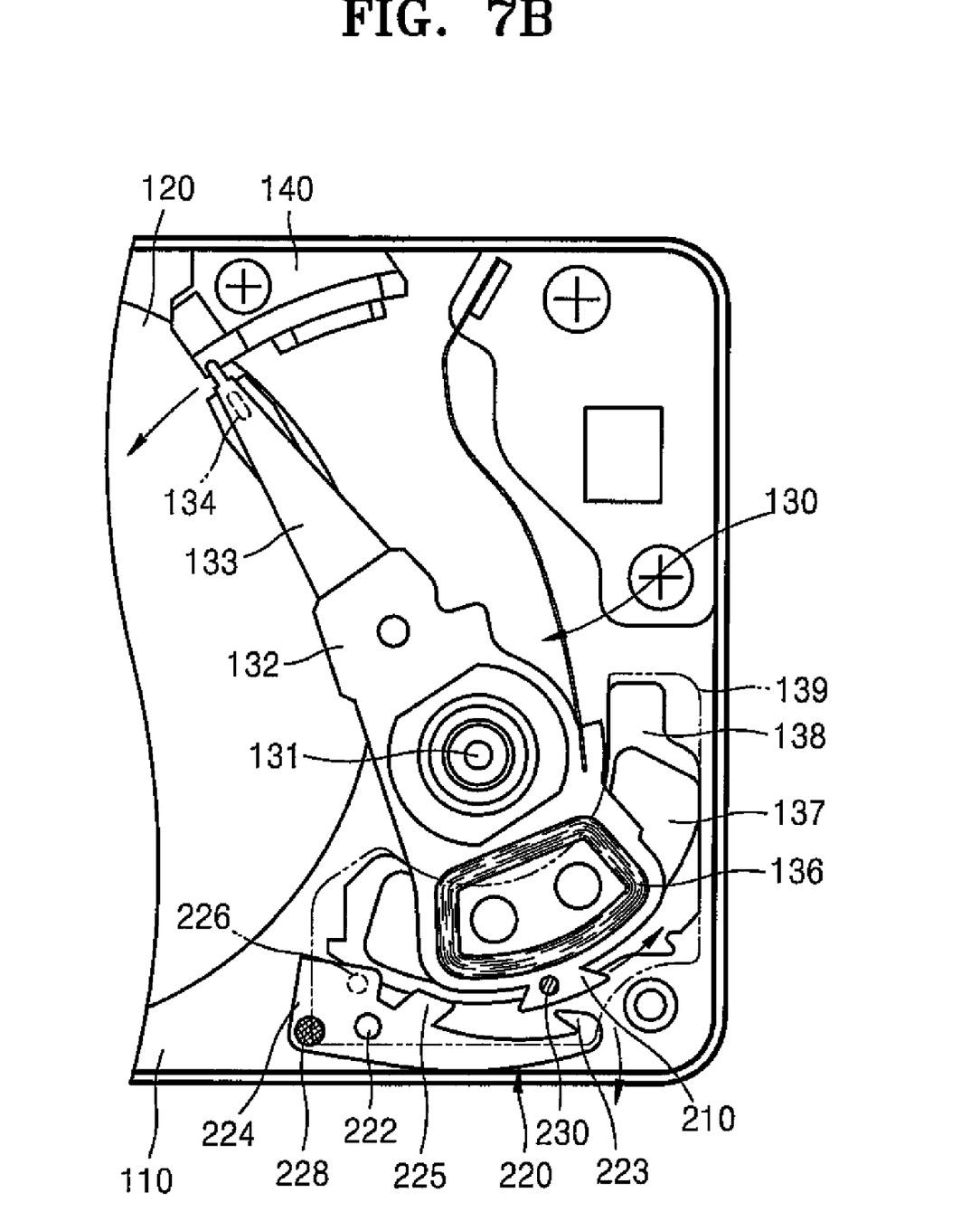
FIG. 7B is a plan view of the actuator latch system, similar to that of FIG. 7, but illustrates a releasing of the actuator by the actuator latch system according to the present invention.

Next, referring to FIG. 7B, when the HDD is turned on, as described above, the interaction between the current flowing thorough the VCM coil 136 and the magnetic field produced by the magnet 137(s) rotates the swing arm 132 counter-clockwise. This force exerted on the swing arm 132 overcomes the torque that is applied to the swing arm 132 in the clockwise direction due to the magnetic force of attraction between the magnet(s) 137 and the second retract member 230. At the same time, the latch lever 220 is rotated clockwise by the torque produced due to the magnetic force of attraction between the first retract member 220 and the magnet(s) 137. Thus, the notch-forming member 210 of the swing arm 132 is not engaged by the hook 223 of the latch lever 220. Also, at this time, as described above, the latch lever 220 rotates quickly, smoothly and reliably because the latch lever 220 is levitated off of the flange 22a of the pivot by a magnetic force. Therefore, the swing arm 132 is released reliably by the latch lever 220 of the actuator latch system.

As described above, in an actuator latch system of an HDD according to the present invention, the latch lever is levitated by magnetism so as not to contact the flange of the pivot or the upper yoke of the VCM. Accordingly, the latch lever can rotate rapidly and reliably and therefore, the actuator of the HDD performs accurately and reliably.

Finally, although the present invention has been described in connection with the preferred embodiments thereof, it is to be understood that the scope of the present invention is not so limited. On the contrary, various modifications of and changes to the preferred embodiments will be apparent to those of ordinary skill in the art. For example, although the actuator latch system of the present invention has been shown and described as applied to an HDD having a ramp loading type of parking system, the present invention can also be applied to an HDD having a CSS type of parking system. Thus, changes to and modifications of the preferred embodiments may fall within the true spirit and scope of the invention as defined by the appended claims.

What is claimed is:

1. A hard disk drive (HDD) comprising:
a base;
a spindle motor mounted to the base;
a disk mounted to the spindle motor so as to be rotated by the spindle motor;
a swing arm supported on the base so as to be rotatable about an axis of rotation, and a magnetic head supported by the swing arm, the swing arm defining a notch at a rear end portion thereof;
a voice coil motor (VCM) that rotates the swing arm, the VCM including a voice coil disposed on the rear end portion of the swing arm, a lower yoke and an upper yoke disposed below and above the VCM coil, respectively, and at least one magnet, each said magnet attached to a respective one of the upper and lower yokes and facing the VCM coil;
a latch lever disposed adjacent the rear end portion of the swing arm when the swing arm is in a position at which the magnetic head is parked, the latch lever being mounted to the base so as to be rotatable about an axis of rotation, and the latch lever having a hook at one end thereof, and a counterbalance at another end thereof, a top surface and a bottom surface; and
a first magnetic retractor integrated with the counterbalance of the latch lever and disposed to the side of the at least one magnet in a direction perpendicular to the axis of rotation of the latch lever, the first magnetic retractor and the at least one magnet producing a magnetic force that generates a torque on the latch lever which biases the latch lever in one direction about the axis of rotation of the latch lever, and
wherein, when the HDD is in an orientation in which the base is facing down and the swing arm is in said position at which the magnetic head is parked, the vertical component of the net magnetic force exerted on the first magnetic retractor by the at least one magnet is about 0 with the latch lever at a height at which the top surface and the bottom surface of the latch lever are entirely out of contact with any surfaces that are located immediately below and above the latch lever, whereby the latch lever is levitated by the magnetic field produced by the at least one magnet as applied to the first magnetic retractor such that a first air gap and a second air gap exist directly below and above the latch lever, respectively.

2. The HDD of claim 1, further comprising a pivot fixed to the base and to which the latch lever is mounted so as to be rotatable about an axis of the pivot, the pivot having a flange at an end thereof adjacent the base, and wherein the latch lever is levitated by the magnetic field produced by the at least one magnet, as applied to the first latch retractor, such that the first air gap is present between the bottom surface of the latch lever and an upper surface of the flange, and the second gap is present between the top surface of the latch lever and a bottom surface of the upper yoke.

3. The HDD of claim 1, wherein the latch lever also has a stopper protruding toward the rear end portion of the swing arm at a location intermediate the hook and the counterbalance.

4. The HDD of claim 3, wherein the stopper protrudes at a location adjacent the axis of rotation of the latch lever.

5. The HDD of claim 1, further comprising a weight attached to the counterbalance of the latch lever.

6. The HDD of claim 1, further comprising a second magnetic retractor integrated with the swing arm at the rear end portion of the swing arm, the second magnetic retractor and the at least one magnet producing a magnetic force that generates a torque on the swing arm which biases the swing arm in one direction about the axis of rotation of the swing arm.

7. The HDD of claim 6, wherein the torque applied to the swing arm due the magnetic force produced by the second magnetic retractor and the at least one magnet is greater than the torque applied to the latch lever due the magnetic force produced by the first magnetic retractor and the at least one magnet.

8. The HDD of claim 1, where in wherein the first magnetic retractor consists of a member of magnetic material.

9. The HDD of claim 8, wherein the member is embedded in the latch lever.

10. The HDD of claim 1, wherein, when the HDD is in either orientation in which the base of the HDD is facing down or the base of the HDD is facing up while the swing arm is at said position at which the magnetic head is parked, the vertical component of the net magnetic force exerted on the first magnetic retractor by the at least one magnet is about 0 with the latch lever is at said height at which the top surface and the bottom surface of the latch lever are entirely out of contact with any surfaces that are located immediately below and above the latch lever.

11. A hard disk drive (HDD) comprising:
a base;
a spindle motor mounted to the base;
a disk mounted to the spindle motor so as to be rotated by the spindle motor;
a swing arm supported on the base so as to be rotatable about an axis of rotation, and a magnetic head supported by the swing arm, the swing arm defining a notch at a rear end portion thereof;
a voice coil motor (VCM) that rotates the swing arm, the VCM including a voice coil disposed on the rear end portion of the swing arm, a lower yoke and an upper yoke disposed below and above the VCM coil, respectively, and at least one magnet, each said magnet attached to a respective one of the upper and lower yokes and facing the VCM coil;
a latch lever disposed adjacent the rear end portion of the swing arm when the swing arm is in a position at which the magnetic head is parked, the latch lever being mounted to the base so as to be rotatable about an axis of rotation, and the latch lever having a hook at one end thereof, and a counterbalance at another end thereof, a top surface and a bottom surface; and a first magnetic retractor integrated with the counterbalance of the latch lever and disposed to the side of the at least one magnet in a direction perpendicular to the axis of rotation of the latch lever, the first magnetic retractor and the at least one magnet producing a magnetic force that generates a torque on the latch lever which biases the latch lever in one direction about the axis of rotation of the latch lever, and wherein, when the HDD is in an orientation in which the base is facing down and the swing arm is in said position at which the magnetic head is parked, the vertical component of the net magnetic force exerted on the first magnetic retractor by the at least one magnet acts upwardly and is greater than the net gravitational force exerted on the latch lever due to the mass of the latch lever and the mass of the first magnetic retractor, whereby the latch lever is levitated by the magnetic force produced by the at least one magnet as applied to the first magnetic retractor.

12. The HDD of claim 11, further comprising a pivot fixed to the base and to which the latch lever is mounted so as to be rotatable about an axis of the pivot, the pivot having a flange at an end thereof adjacent the base, and wherein the latch lever is levitated by the magnetic field produced by the at least one magnet, as applied to the first latch retractor, such that a first air gap is present between the bottom surface of the latch lever and an upper surface of the flange, and a second gap is present between the top surface of the latch lever and a bottom surface of the upper yoke.

13. The HDD of claim 11, wherein the latch lever also has a stopper protruding toward the rear end portion of the swing arm at a location intermediate the hook and the counterbalance.

14. The HDD of claim 13, wherein the stopper protrudes at a location adjacent the axis of rotation of the latch lever.

15. The HDD of claim 11, further comprising a weight attached to the counterbalance of the latch lever.

16. The HDD of claim 11, further comprising a second magnetic retractor integrated with the swing arm at the rear end portion of the swing arm, the second magnetic retractor and the at least one magnet producing a magnetic force that generates a torque on the swing arm which biases the swing arm in one direction about the axis of rotation of the swing arm.

17. The HDD of claim 16, wherein the torque applied to the swing arm due the magnetic force produced by the second magnetic retractor and the at least one magnet is greater than the torque applied to the latch lever due to the magnetic force produced by the first magnetic retractor and the at least one magnet.

18. The HDD of claim 11, where in the first magnetic retractor consists of a member of magnetic material.

19. The HDD of claim 18, wherein the member is embedded in the latch lever.

20. The HDD of claim 11, wherein, when the HDD is in either orientation in which the base of the HDD is facing down or the base of the HDD is facing up while the swing arm is at said position at which the magnetic head is parked, the vertical component of the net magnetic force exerted on the first magnetic retractor by the at least one magnet acts upwardly and is greater than the net gravitational force exerted on the latch lever due to the mass of the latch lever and the mass of the first magnetic retractor.

* * * * *